United States Patent

Woods et al.

[11] 4,020,471
[45] Apr. 26, 1977

[54] INTERRUPT SCAN AND PROCESSING SYSTEM FOR A DATA PROCESSING SYSTEM

[75] Inventors: William E. Woods, Natick; Philip E. Stanley, Westboro, both of Mass.

[73] Assignee: Honeywell Information Systems, Inc., Waltham, Mass.

[22] Filed: June 30, 1975

[21] Appl. No.: 591,905

[52] U.S. Cl. .......................................... 340/172.5
[51] Int. Cl.[2] ..................................... G06F 9/18
[58] Field of Search ............................ 340/172.5

[56] References Cited

UNITED STATES PATENTS

| | | | |
|---|---|---|---|
| 3,490,003 | 1/1970 | Herold et al. | 340/172.5 |
| 3,909,790 | 9/1975 | Shapiro et al. | 340/172.5 |
| 3,949,371 | 4/1976 | Pederzini | 340/172.5 |
| R28,221 | 11/1974 | Benghias | 340/172.5 |

Primary Examiner—Gareth D. Shaw
Assistant Examiner—C. T. Bartz
Attorney, Agent, or Firm—John S. Solakian; Ronald T. Reiling

[57] ABSTRACT

In a data processing system, interrupt service is provided for any one of a plurality of interrupt sources which presents an interrupt signal which has a higher interrupt level than that of the currently active source. Interrupt flags are provided for each potential interrupt source, which flags are activated in response to the receipt of an interrupt signal from the interrupt source associated therewith. A scan for the highest interrupt level is made and interrupt service is provided for the interrupt source associated therewith.

16 Claims, 10 Drawing Figures

INTERRUPT SCAN AND PROCESSING SYSTEM FOR A DATA PROCESSING SYSTEM

BACKGROUND OF THE INVENTION

The present invention relates generally to data processing systems and more particularly to data processing systems which have a plurality of interrupt sources in response to an interrupt request from which interrupt service is provided.

There are various types of interrupt processing systems in the prior art which are coupled to provide interrupt service in response to an interrupt signal received from any one of a number of sources such as peripherals connected on an input/output bus. Typically, the procedure followed for servicing interrupts from such peripherals first requires identifying the interrupting peripheral, next requesting the status of the peripheral and then providing the status. This procedure is relatively slow and in certain types of systems where interrupt routines are executed frequently, the acknowledge routine time may pose serious speed restraints on the total system. In one such interrupt system, as indicated in U.S. Pat. No. 3,881,174, the interrupt processing apparatus includes a computer which allows a peripheral, upon receiving an acknowledgement from a computer of an interrupt request which the peripheral previously generated, to simultaneously provide the computer with its address and status thereby shortening the time required for the interrupt routine. Thus the time saved in processing interrupt requests is very important particularly where such interrupt requests occur frequently, not only from peripherals coupled to the computer, but also from internal interrupt sources such as those which may be generated by computer programs executing in the computer. The processing of such interrupts within the computer in order to enable interrupt service must therefore be capable of distinguishing different types of interrupts as well as the priority or interruptability level associated therewith and in response thereto provide a mechanism for enabling such interrupt service in as short a time as possible.

It is accordingly one of the principal objects of the present invention to provide a computer system which includes an improved interrupt processing system.

SUMMARY OF THE INVENTION

The above and other objects of the invention are obtained by providing a data processing system having interrupt processing apparatus coupled to receive interrupt signals from any one of a plurality of interrupt sources. An interrupt signal is indicative of any one of a plurality of interrupt levels. The levels are numbered so that a first number indicates the highest interrupt level and so that a last number indicates the lowest interrupt level. Interrupt flag register means is provided having a plurality of flag locations equal in number to the number of interrupt levels. The flag locations are numbered in correspondence with the respective numbers of the interrupt levels. Means are provided, responsive to an interrupt signal, for activating a one of the flag locations corresponding in number to the level number indicated by the interrupt signal, following which a scan is provided for determining which one of the flag locations is an activated location having the highest interrupt level relative to any other activated flag location. Interrupt service is provided in response to the scanning of such flags for the one of interrupt sources associated with the one of the flag locations which is indicative of the highest activated interrupt level.

BRIEF DESCRIPTION OF THE DRAWINGS

The above and other objects, advantages and features of the present invention will become more readily apparent from a review of the following specification when taken in conjunction with the drawings wherein.

DETAILED DESCRIPTION OF THE PREFERRED EMBODIMENTS

Figure 1:
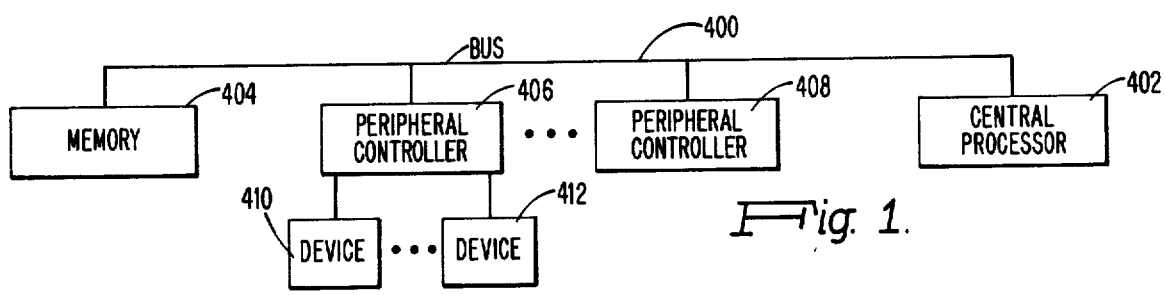
FIG. 1 illustrates the environment in which the invention is embodied.

The interrupt mechanism of the present invention is included in that environment as generally shown in FIG. 1. The common bus 400 is coupled with a central processor 402 at one end and at least one memory device 404 at the other end of the bus 400. Also coupled on the bus may be various peripheral controllers such as those used for controlling a tape or disc storage device, communications devices, options such as scientific and arithmetic units and other unit record peripherals such as card readers. Such peripheral controllers are shown generally as controllers 406 and 408 with typically a controller such as controller 406 coupled to control two or more peripheral devices 410 and 412.

The interrupt structure of the present invention allows interrupts to be received by the central processor 402 from any one of the devices coupled with the bus 400. Accordingly, controller 406 may, for example, generate an interrupt. Such interrupts received from such devices coupled with the bus are referred to as external interrupts. In addition, interrupts may be generated internal to the central processor under computer program control.

The interrupts generated in the system, whether they be external or internal to the processor 402, are generated asynchronously with respect to the operation of the system, including the current computer program being processed in the processor 402. The interrupts may be classified by their source, as previously mentioned as being either external or internal to the processor 402. Externally generated interrupts may be so generated by any one of the following events: that a peripheral device of a unit requires service, that there is a power failure, that there is a time out such as via a watchdog timer or a real time clock indicating for example that an operation has not taken place within a prescribed time. Internally generated interrupts may be generated by an instruction indicated as the LEV instruction which shall be discussed hereinafter more specifically with respect to FIG. 2.

There are various priority levels associated with the interrupts in the system. Every computer program in the central processor executes at a priority level defined by a six bit level code. The executing computer program in the processor 402 may be interrupted by an event having a priority level that is "greater" than the level of the currently executing program. A level equal to zero has the highest priority and the higher numbered levels have the lower priority. In a system, several interrupt levels may be utilized such as for example 64 different levels such that levels range from level numbers zero through 63 with level number 63 having the lowest priority. Associated with each level is a corresponding interrupt vector (IV) which is stored in a dedicated memory location. The interrupt vector is a pointer to an interrupt saving area (ISA). When a program executing is interrupted, its context is stored in its corresponding interrupt save area. The context of the interrupting process is retrieved from the interrupt save area of the interrupting level. This interrupting process then starts executing at its assigned level. Different processes or programs may be running at different levels. Further, a process or program may have more than one level associated with it. For example, normally the program may run at one level and when it starts to execute at a point where it does not want to be interrupted, except for example, for a power failure, it may make a level change (to a lower numbered level) so as to be less interruptable. Associated with the 64 different levels may be a register of 64 bits (which may for example be located in memory) in order to indicate what levels are currently active, that is, what levels and accordingly processes are ready for execution. Usually, the level currently executing corresponds to the most significant bit set. These 64 bits are referred to as activity flag bits and are set by the external interrupt requests and are set and/or cleared by the LEV instruction generated internally in the processor 402.

Figure 3:
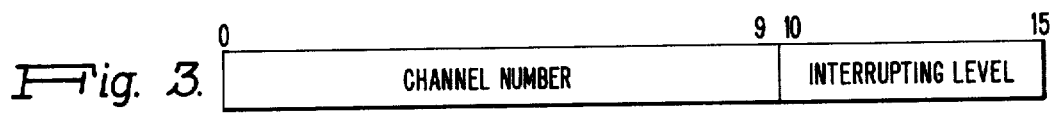
FIG. 3 illustrates the format of a location in an interrupt save area used in conjunction with the present invention.

When an external interrupt occurs, the interrupt vector for the interrupted level is extracted and provides access to its interrupt save area, into which are stored the contents of selected registers which may be included in the processor 402. These registers may for example include the program counter and other special registers such as for example commonly used memory registers as well as other general registers. Depending upon the number of such registers, the contents of which must be saved, and assuming by way of example that the number of such registers is no greater than 16, then a 16 bit interrupt save mask register (ISM), which may be contained for example in the interrupt save area, controls the subset of the registers to be saved. The interrupt vector for the interrupting level is used similarly to gain access to its interrupt save area from which the contents of the registers previously saved for it are again loaded back into such registers. The identity of the interrupting channel is stored in a location of its interrupt save area. The format of such location is as shown in FIG. 3, with bits zero through nine indicating the channel number and bits ten through fifteen indicating the interrupting level.

If the interrupt vector of the interrupting level contains an invalid address, then the interrupt is not honored. More particularly for example, if the interrupt vector is all zeroes, then this cannot be a proper interrupt vector since by definition the vector must point to the interrupt save area which for example starts at a location other than zero. If the interrupt is honored, a scan of the activity flag bits will be made as hereinafter described. If the interrupt vector of the interrupting channel is the same as the vector of the currently executing interrupt level, i.e., for example, a quick level change, then the context save and restore process is bypassed and the current level may keep executing. Thus in such case, the saving of the registers of the interrupted level and the restoring of the contents of the registers of the interrupting level need not be performed.

Figure 2:
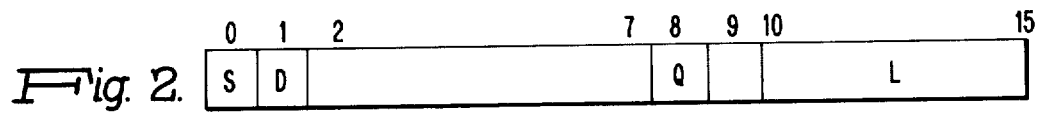
FIG. 2 illustrates the format of an interrupt signal as used in conjunction with the present invention.

The internally generated interrupt of the processor 402 is so provided in the format of an LEV instruction which has as parameters the indicated fields and its operand as shown in FIG. 2. This instruction is used to set or clear (reset) the activity flag bits, and either inhibit or enable interrupts. The LEV instruction basically has four fields in order to control various actions. The four basic fields are the S field in bit location zero, the D field in bit location one, the Q field in bit location eight and the L field in bit locations 10 through 15. Bits two through seven and nine are not used. The fields have the following meanings. S means to suspend the current level. D means to defer interrupts. Q means a quick level change as shall be hereinafter described. L defines the interrupt level number. The various actions performed in response to the setting or resetting of such bits depend upon the binary state of the S, D and Q bits, in the LEV instruction of FIG. 2. In some cases, it does not matter what binary state the bit for a particular field is in, as shall be presently described.

The various combinations of the S, D and Q bits will be referred to hereinafter as the first condition, second conditions, etc. through the fifth condition. The first condition is that condition where the S, D and Q bits or fields are all binary ZERO. This means that level L will be scheduled, and the highest priority scheduled level scanned for and dispatched. The second condition is where the S and Q fields are binary ZEROES and the D field is a binary ONE. This means that level L will be scheduled, but no other action taken as a result of this instruction. The third condition is where the Q field is a binary ONE and the S field is a binary ZERO and the D field is a don't care state, i.e., the D field or bit may be either a binary ONE or a binary ZERO. This means that there will be an inhibit to the level L. The fourth condition is where the S field is a binary ONE, the Q field is a binary ZERO and the D field is a don't care condition. This means that level L is to be scheduled, that the current level will be suspended, and the highest priority scheduled level shall be scanned for and dispatched. The fifth condition is that case where both the S and Q fields are a binary ONE and the D field is a don't care condition. This means that there should be an inhibit to level L and that the current level will be suspended.

In order to understand the above five conditions, explanation of the meanings of the words used in describing the particular bits is presently set forth. The term schedule means that the activity flag will be set for the specified level. The term scan and dispatch means that there will be a scan of activity flags such that the highest active level is found and given control of the processor. The term defer interrupt means that there shall not be a scan and dispatch at this time. The term inhibit means that the level of the currently running process will be changed, and that the activity flag for a new level will be set, and further that there will not be a context, save and restore operation. This is commonly used for a quick level change to a higher level. The term suspend means that the activity flag for the current running level will be cleared.

Now referring to the flow diagram of FIG. 4, the operation of the five conditions will be explained. The normal operation of the system begins at block 10 when there is a fetch of an instruction, the beginning point of which is indicated by block 11. The fetch is for an instruction (which may be located in memory) which is to be executed and takes place in a conventional manner well known in the art. Following this, a query is made as to whether or not a pulse utilized to for example decrement the time out function has been received. This time or clock pulse may be for example derived from the AC voltage power line and may be about 8 milliseconds spaced in time, between which time many fetch operations may occur. If there is a pulse generated as indicated by the yes answer of block 12, then the time out decrement function of block 27 is entered as shall be hereinafter explained. If there has been no clock pulse so generated, then the question is asked via block 13 as to whether or not there has been an external interrupt. If there has not been an external interrupt, then the instruction is finally fetched as indicated by block 14. At block 15, the instruction is tested to determine whether or not it is an internal interrupt generated by central processor 402 as indicated by the LEV instruction. If this is not an LEV instruction, then the fetched instruction is executed as indicated at block 16 and the process is reentered at block 10. Thus this explains the normal operation of the system when a fetch of the instruction is made and executed without either internal or external interrupts and without a clock pulse being generated.

The next case is that where a clock pulse has been generated as indicated at block 12 to decrement the time out function (TOF) as indicated in block 50 of the time out function 27. A test is then made as to whether or not the decrementing of such time out function in block 50 has caused the resultant count to be equal to for example, zero, as indicated in block 52. If the answer is no, then block 10 is again entered and a new fetch begins at block 11. If the answer is yes, then the number of the time out function level is set or created as indicated by block 54. The operation of block 54 as well as that of block 17 to be hereinafter discussed operate so as to set the S, D and Q bits each equal to zero as indicated by block 56 so that as shall be hereinafter explained, the activity flag of the highest level is scanned, following which there may be a save and restore of the contents of the various registers in order to service such higher active level.

Prior to discussing the conditions whereby an external interrupt is sensed, as indicated by a yes answer to block 13, the internal interrupt condition will be discussed. Accordingly, when a yes answer is generated by block 15, this indicates than an LEV instruction was fetched, and block 18 is entered and the activity flag of the level specified by the LEV instruction is set. The LEV instruction may have been inserted under program control for example. Thus, with reference to FIG. 2, the L field of such operand is utilized to set the activity flag bit associated with such level. Following this, in one embodiment, the output of block 18 feeds into the decision box 20 directly by means of line 19. As an alternative embodiment, and as shall be hereinafter discussed with respect to external interrupts, block 19A may be entered.

Thus, by block 18, a new level is scheduled following which, by block 20, question is made as to whether or not the S bit has been set, i.e., to a binary ONE. Assuming the first condition, i.e., that the S, Q and D bits are all equal to a binary ZERO, then the answer to block 20 is no, as is the case for block 23 and block 24, which thereby causes block 25 to be entered. In block 25, the activity flags or bits are scanned to determine which one of such flags indicates the highest active level. Following this scan, the interrupt vector of the highest active level may be checked to determine whether or not it is valid as indicated by block 26. IF it is not valid, then block 21 is entered and the flag of such level is cleared, following which, in response to a no answer from block 22, the flags are scanned again for the highest active level. If the answer to block 26 is yes, i.e., that there is a valid interrupt vector, then a check is made as to whether or not the new interrupt vector is equal to the old interrupt vector as indicated by block 28. In normal circumstances, the answer to block 28 is no and block 30 is entered whereby as a first step, the contents of the registers for the old level are saved in the interrupt save area (ISA) pointed to by the interrupt vector for that level and the registers are restored with the contents thereof from the interrupt save area of the interrupting level. Following this operation a fetch is again entered at block 10. Thus, assuming the condition where the S, D and Q bits are all equal to a binary ZERO, and in summary of condition one, the new level is scheduled by block 18, a scan of the flags is made to determine which one is the highest active level, as indicated by block 25, and as indicated by block 30, there is a save and restore function performed.

For condition two, where the S, D and Q bits are respectively a binary ZERO, a binary ONE and a binary ZERO, this condition operates beginning from block 10 and going through block 15, assuming no time or clock pulse has been generated and there is no external interrupt, and the new level is scheduled as indicated by block 18. Block 20 is then entered following which block 23 is entered. The flow takes the same path to block 24 because the Q bit is a binary ZERO. In this case, however, the D bit being a binary ONE, then the answer to block 24 will be yes and block 10 will be entered again. Thus, by the second condition, what has happened is that the internal interrupt has caused a new level to be scheduled, however the operation on the new interrupt level has been deferred.

It can be seen that the utility of the second condition may be where, for example, there is a desire to schedule a lower priority process than the one currently in control with the intention of scheduling perhaps several lower priority processes before relinquishing control of any of them. Since these processes are lower priority, there is no purpose of instituting a scan until such time as the current executing level suspends its operation.

Now with reference to the operation for condition three, the S, D and Q bits are respectively a binary ZERO, a don't care state, and a binary ONE. The operation occurs as was the case for conditions one and two such that block 18 causes the scheduling of the specified level of the LEV instruction. Since the S bit is a binary ZERO, and block 20 having being entered via line 19, block 23 is entered which because the Q bit is a binary ONE causes a yes answer to be generated thereby causing the process to enter block 29. By block 29, the level of the currently running process will be changed and the contents of the registers will not be saved and restored. Typically condition three is used for a quick level change to a higher operating level so that the running process will be less interruptable. Thus by block 29, the old ISA address which is pointed to by the previous operating level is placed in the new interrupt vector level location. Thus for such case, both the old interrupt vector location and the new interrupt vector location are pointing to the same interrupt save area. The new interrupt vector is usually one which is not committed to any specific interrupt save area and which may be utilized in such situations where the running process desired to be less interruptable. Accordingly, there need be no swapping of the interrupt save area registers since in fact the same interrupt save area is used and the same process is running. This will also be the case when there is a quick level change back into the lower priority level. In addition to placing the old ISA address in the new IV level location, by block 29, a broadcast is made over the bus of the level change to other devices so as to indicate to such other devices, as may be waiting to transmit an external interrupt to the processor, that there has been a level change and that they should try to gain access for use of the bus at this time particularly in that situation when there is a level change to a lower level. Following the function provided by block 29, the fetch cycle is again entered at block 10.

During the fourth condition, the S and Q bits are respectively a binary ONE and a binary ZERO with the D bit being a don't care condition. Thus the operation will begin at block 10 and continue through blocks 15 and 18 at which time a schedule is performed by the setting of the flag of the specified level. Block 20 will then be entered and it will be found that the S bit is equal to a binary ONE, which accordingly will cause block 21 to be entered. This will cause the activity flag of the current level to be cleared. Thus what has happened is that the indicated level has been scheduled and then the operation of the current level has been suspended following which because the Q bit is equal to a binary ZERO, block 22 is entered and exited at the no output thereof so as to enter block 25 causing a scan of the flags for the highest active level. This is accomplished typically so that the operation flows through block 26, block 28 and then block 30 and back to block 10 and accordingly there is a save and restore operation performed. Thus in summary, the new level has been scheduled and the current level has been suspended and a save and restore operation has taken place in response to the indication from the scan of the highest active level. This could be used for scheduling or invoking a process of either a higher or lower level than that of the current process.

For the fifth condition where both the S and Q bits are a binary ONE and the D bit is a don't care condition, the operation is the same as the fourth condition in that block 20 is entered and block 21 operates to clear the flag of the current level. However, in this case where the Q bit is equal to one, a yes answer from block 22 causes block 29 to be entered thereby causing a quick level change and a broadcast of the level change to the other devices via the bus. Following this operation, block 10 is again entered. Thus for the fifth condition, what happens is that the specified level is scheduled, the current level is suspended and the old ISA address, i.e., that pointed to by the just suspended level, is placed in the new IV level location thereby enabling a quick level change to another level for the current running process, relinquishing the old, i.e. current, level.

Having now described the operation of the previously mentioned five conditions, the external interrupt situation will now be discussed. If there is an external interrupt in response to the setting of the external interrupt flag, block 13 will generate a yes answer, and block 17 will be entered. At this time, the identity and level of the external interrupting device will be read and stored in the interrupt save area for that level. Following this, there will be a scheduling of such level indicated by the external interrupt followed by a dispatch thereof. Accordingly this operation will be the same as that for the first condition wherein each of the S, D and Q bits are equal to a binary ZERO. Thus, in response to block 17, block 56 will be entered such that such bits are all set to be equal to a binary ZERO and the process will continue as for condition one. As indicated hereinbefore for the time out function, this function as indicated by block 27 also acts to set bits S, D and Q equal to a binary ZERO as indicated by block 56 so that the operation of condition one is also followed in response thereto. In each of these cases, when the activity flags are scanned, the cause of the interrupt will be allowed to function via the interrupt save area and finally its own interrupt routine.

As indicated hereinbefore, if the new interrupt vector is not equal to the old interrupt vector, then block 30 is entered for the save and restore function. However, if such vectors are equal, then the operation of block 29 is entered. If the answer is yes to block 28, either the scan found no activity level higher than the current one, or, the process which caused an inhibit has just suspended (to return to normal).

As previously indicated, the normal path between the scheduling of block 18 and the test of block 20 is the line 19. In an alternative embodiment, where there is an external interrupt, the path of line 19 directly from block 18 to block 20 may be eliminated and the test for an external interrupt may be made, as indicated by dotted line block 19A. If this is not an external interrupt, then block 20 will be directly entered. However, if this is an external interrupt and accordingly a yes answer is generated, then block 26 may be entered directly from block 19A via line 19B. This eliminates the need for scanning of the activity flags for the highest active level as indicated by block 25. This is premised on the fact that once an external interrupt is allowed to set the external interrupt flag, this means, as shall be hereinafter discussed, that in fact that the external interrupt's level is higher than the current operating level in the central processor 402. Accordingly, and in such case, a scan need not be made for the highest active level, since by definition, the external interrupt has the highest active level. Thus, from the yes answer of block 19A, the path of line 19B and then normally, the operation of blocks 26, 28 and block 30 and then block 10 will be provided so as to process the external interrupt in a minimal period of time. One potential problem associated with this external interrupt time saving technique is that although at the time the external interrupt flag was set, this indicated the external interrupt to be the highest active level, i.e. a level higher than that associated with the current running process of the central processor 402, it is entirely possible that prior to the next fetch, even though only microseconds later, there may be another higher level process (a higher level than the level of the external interrupt) which is requesting processing time. In such case that, it would be undesirable for the external interrupt now of lower priority to interrupt or execute before the process of higher priority. However, as a tradeoff, by the process as indicated by the dotted lines 19A and 19B, it is possible to save the time associated with the comparisons and scanning operations as shown in FIG. 4, however, the process of a higher level may be interrupted by external interrupts of lower level even though such external interrupt had the highest level at the time it was allowed to set its external interrupt flag.

The operation of the interrupt structure of the present invention has been described by the flow diagram of FIG. 4 and will be hereinafter discussed more particularly with reference to FIG. 5 which illustrates the interrupt processing apparatus of the present invention. FIGS. 6 through 10 show certain details of the apparatus of FIG. 5. Thus, now referring to FIG. 5, an interrupt may be either an external or internal interrupt, an external interrupt being generated by any one of the devices coupled on bus 400 and an internal interrupt being generated by the central processor 402 by means of the LEV instruction or by depletion of the time out function. The external interrupt on line 300 includes its level which is received at the A input of the comparator 302. Received at the B input of comparator 302 is the current level of the process running in the central processor 402 as indicated by block 304. As indicated hereinbefore, a level number equal to zero is the highest priority level and a level number equal to 63 is the lowest priority level. Accordingly, if the external interrupt level number is less than the current level number, then if external interrupt flag 311 has not been previously set, flag 311 will then be set by the enabling of AND gate 309. The enabling of gate 309 will enable gate 307 to pass the interrupt level to register 315 for storage therein.

Figure 6:
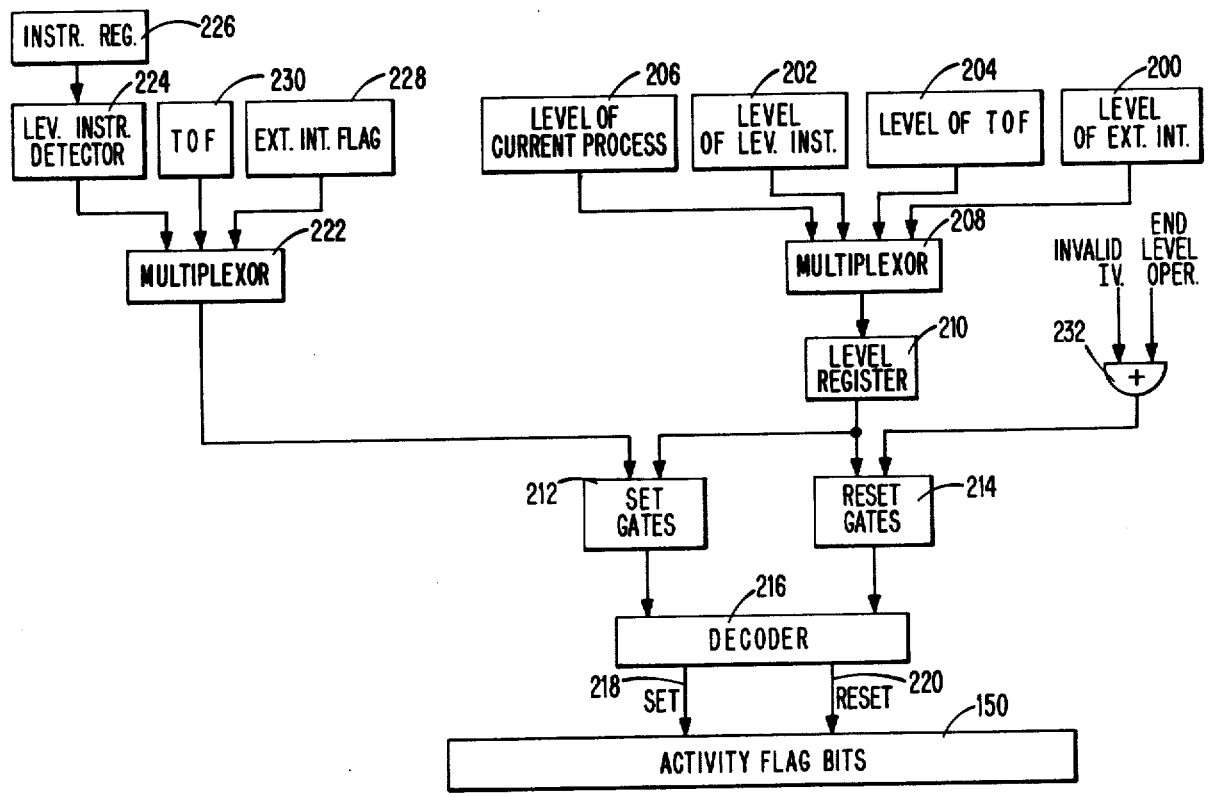
FIG. 6 is a detailed logic diagram illustrating the manner in which interrupt flags are set or cleared in conjunction with the operation of the present invention.
Figure 7:
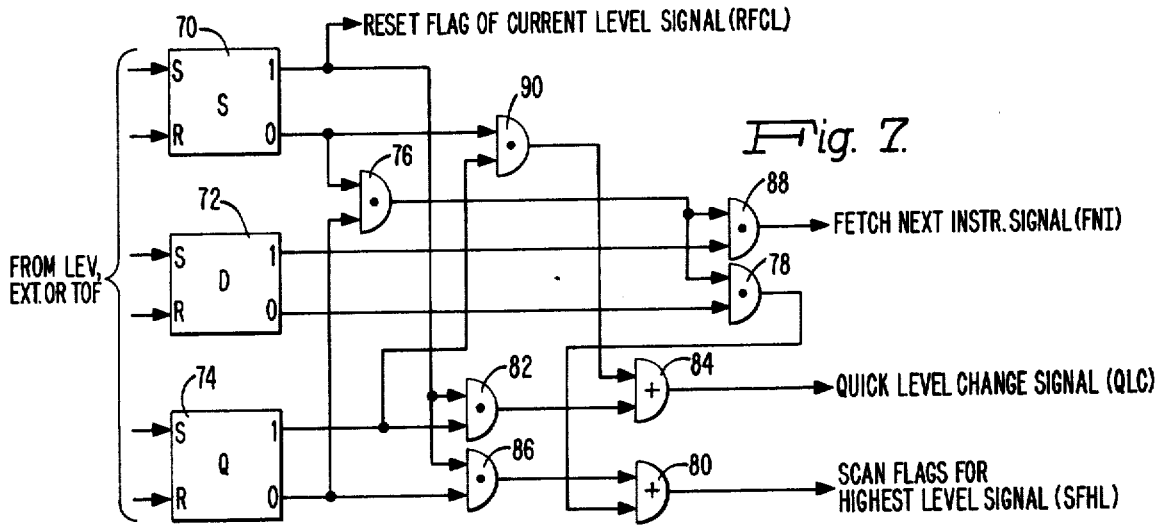
FIG. 7 is a detailed logic diagram illustrating the manner in which various signals are produced in response to an interrupt signal.

The enable signal received at gate 307 will enable the interrupt level to be provided, via register 315, to set the associated flag of the interrupt specified level via logic 308. The enabling of gate 307 also enables the bits S, D and Q to be set to zero and received by interrupt decode logic 310 via register 315. The internal interrupt by way of the LEV instruction is received on line 312 with the level number and the binary state of the S, D and Q bits as indicated in register 314. The level designation in register 314 is also received by logic 308 and the S, D and Q bit states are received by logic 310. The logic 308 is generally shown in FIG. 6. The activity flags 150 are set via logic 308. Logic 310 is coupled to clear such flags by means of the RFCL signal generated in response to a suspend request or an invalid interrupt vector. A flag bit is generally cleared when the operation associated with its level has been completed. Depending upon the state of the S, D and Q bits received by interrupt decode logic 310, one or more of four signals will be generated. As indicated, the RFCL signal will reset or clear the associated level's flag. Also generated may be the SFHL signal, the QLC signal, or the FNI signal. The SFHL signal indicates that the activity flags should be scanned to determine which level is the highest active level (the one generally waiting for interrupt service). The OLC signal indicates that there will be a quick level change to another, preferably usually a higher level. The FNI signal indicates that the next instruction should be fetched. The decode logic 310 is shown in FIG. 7.

In response to the SFHL signal, the scanner logic 316 will be enabled. Scanner logic 316 as well as logic 318 is more particularly shown in FIG. 8. Scanner logic 316 operates to indicate which one of the activity flag bits in register 150 indicates the highest level which is ready to be serviced. In response to logic 316, the interrupt vector address will be generated and will be formed via the address generation and check logic 318. This logic is utilized to address the interrupt vectors 108 and to initiate the QLC operation or the save and restore contents of registers operation. The quick level change operation may also be independently initiated in response to the QLC signal provided by logic 310. Logic 318 accordingly provides an address to the interrupt vectors (IV) 108. Each of the interrupt vectors points to the associated interrupt save area (ISA). Thus, IV0 points to ISA-0 which may be located in any location in memory. Not all interrupt vectors need be committed to a particular interrupt save area as shall be hereinafter discussed. The interrupt save areas include a plurality of locations sufficient to store the necessary information associated with the different levels. More particularly, the interrupt save areas may each store the contents for that level of the working registers in the central processor 202. Such registers may include the program counter for example. Not all levels need store the contents of the same registers. Thus if a level is interrupted by a higher level, then there will be a save and restore operation. This is indicated by the SRCR signal generated by logic 318 which enables save and restore logic 320 which is more particularly described with respect to FIG. 9. Thus logic 320 enables the bilateral transfer of the contents of the registers with the interrupt save area. Initially, during such save and restore function, the contents of the registers associated with the current level, i.e. the interrupted level, will be stored in its respective interrupt save area as addressed by logic 318. After this saving process is completed, then the registers will be restored with the contents of the new level's associated interrupt save area.

Figure 10:
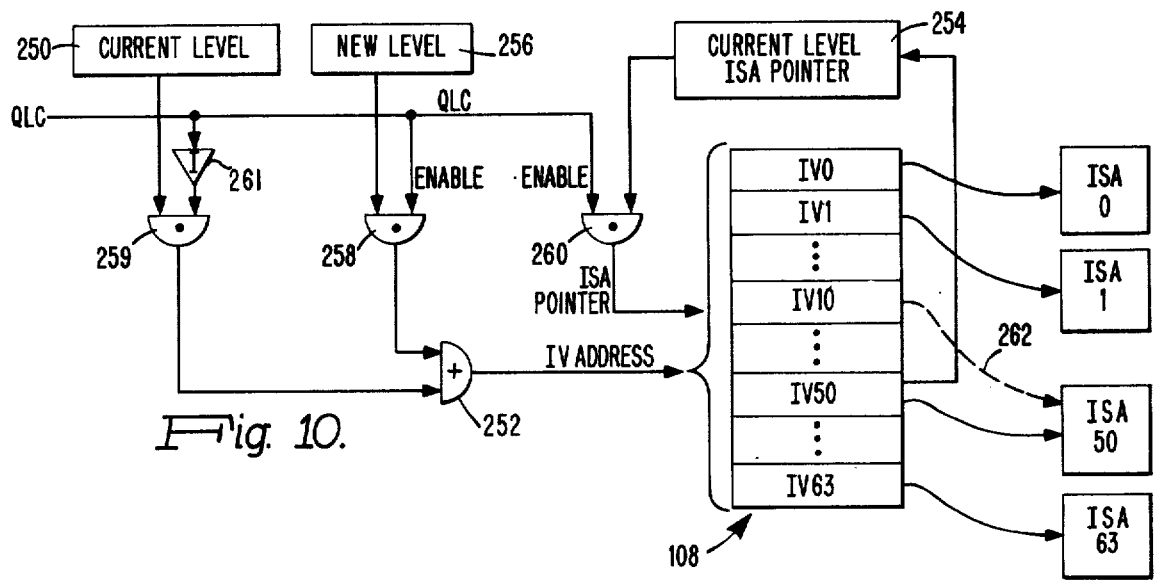
FIG. 10 is a detailed logic diagram illustrating the manner in which an interrupt level change may be provided in accordance with the teachings of the present invention.

The quick level change which may be initiated by logic 318 or logic 310, operates to enable the quick level change logic 322 more particularly shown in FIG. 10. This does not require a save and restore operation. The quick level change enables the current level to jump to a higher level and enable such higher level to point to the same interrupt save area as the current level. Accordingly, a process may be running at a level (current) and may desire to be less interruptable and may accordingly switch to a higher level. The save and restore function need not be provided at this time since in fact the same process is running. The reverse procedure is made when there is a change back to the lower and more interruptable level.

Figure 4:
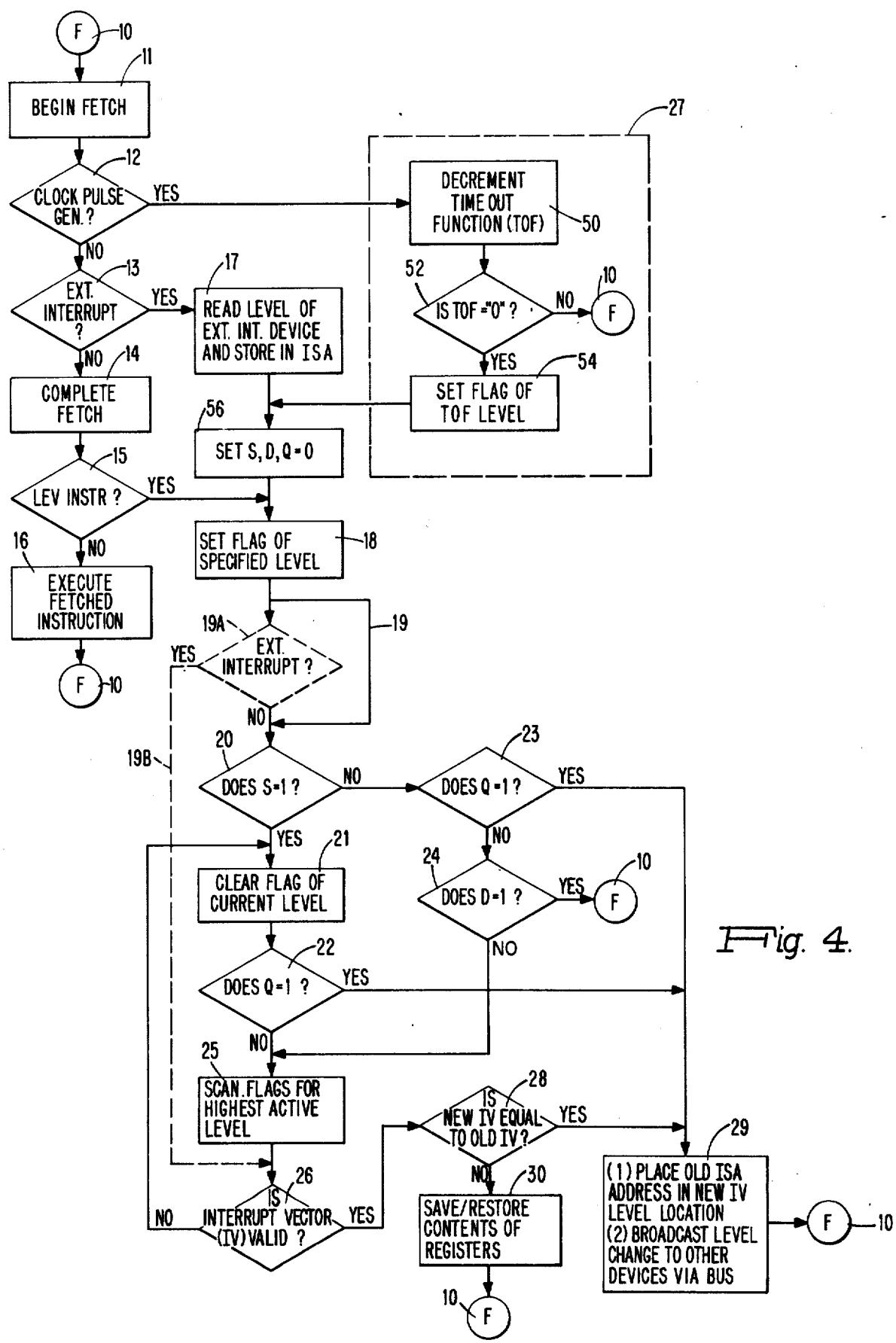
FIG. 4 illustrates a flow diagram of the operation of the present invention.
Figure 5:
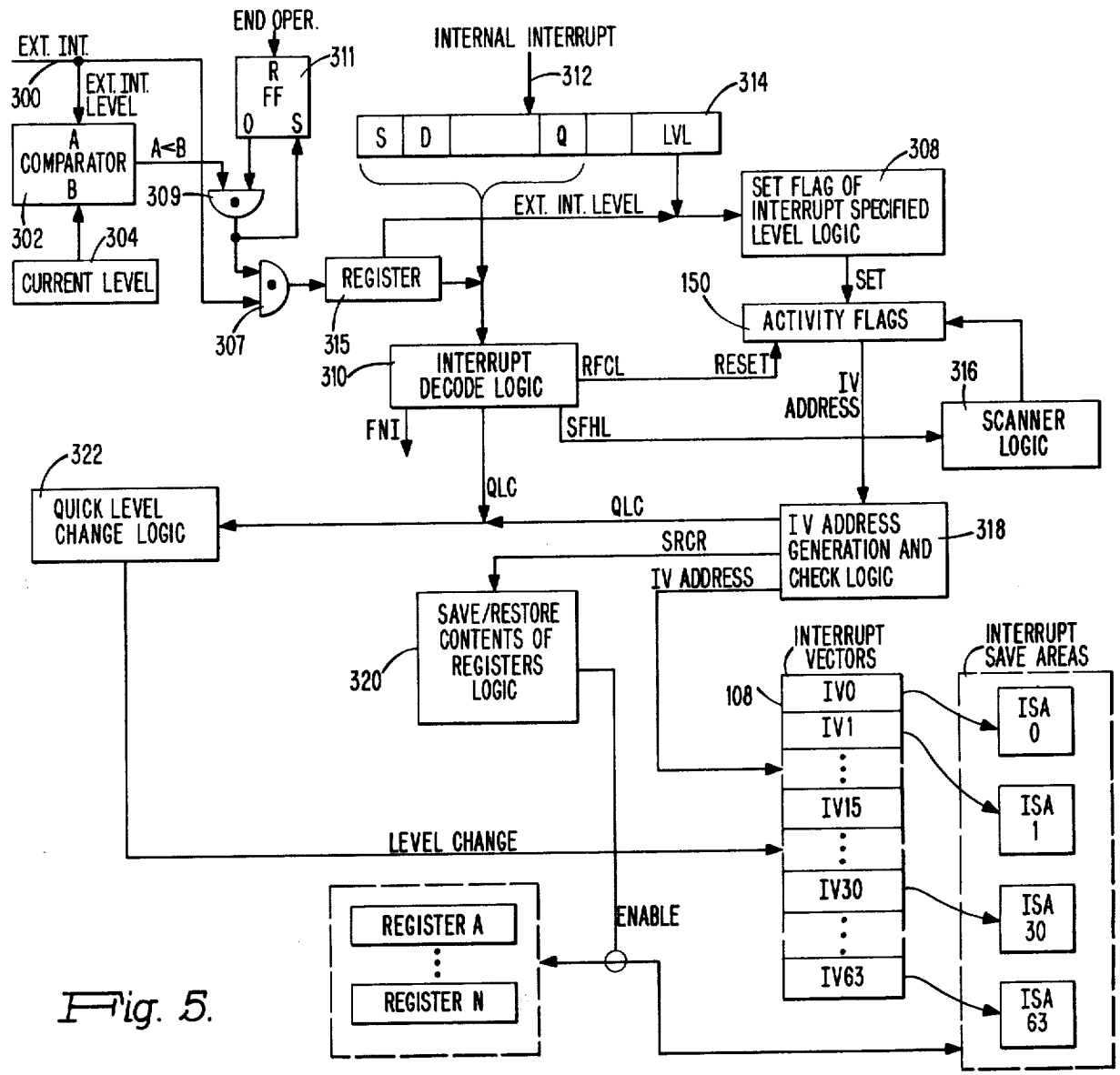
FIG. 5 illustrates a general block diagram of the apparatus of the present invention.

The manner in which the flag of the specified level is set as indicated by block 18 of FIG. 4 shall now be discussed. As indicated by FIG. 6, the level may be provided by either the external interrupt, the internal interrupt (LEV instruction), or the time out function. These levels may be received by registers 200, 202 or 204 as shown in FIG. 6. Depending upon the state of the interrupt operation as shown in FIG. 4, then one of these levels which is received from the respective register via OR gate 208 is placed in a general level register 210 for use in setting the activity flat bit in question. The activity flag bits are shown in register 150 and may for example be 64 in number. Whether such bits will be set or cleared (reset) depends upon the operation which has taken place. Setting and clearing is provided in response to signals enabled by set gates 212 and reset gates 214 which in response to the level number contained in register 210 operates via a decoder 216 to place a signal on one of the 64 set lines 218 coupled from the outputs of the decoder 216 to the set inputs of the elements in register 150. Similarly, one of the 64 reset lines 220 coupled between the outputs of decoder 216 and register 150 may be activated via reset gates 214. A set condition is indicated via OR gate 222 if the LEV instruction is detected by means of detector 224 coupled to the general instruction register 226. This corresponds to the operation of block 15 of FIG. 4. The setting of one of such bits in register 150 is also provided in response to the setting of the external interrupt flag, element 311, which is coupled to receive a signal via the bus from one of the devices which desires the interrupt service. As has been seen from FIG. 5, the only device which can set the flag 311 is a device which has a level which is higher than the currently operating level in the central processor 402. One of the activity flag bits in register 150 may also be set in response to the time out function as indicated by the operation of block 27 in FIG. 4 such that upon receipt of an indication of a time out function by register 230, the bit associated with the level of the time out function will be set in register 150. Activity flag bits in register 150 will be reset if there is an invalid interrupt vector indicated by the operation of block 26. This is coupled to reset gate 214 via OR gate 232. The particular respective activity bit will also be reset if the level associated therewith, as indicated by the current level of register 206, completes its operation and issues an LEV instruction specifying suspend. Thus, the flag of the specified level of the interrupt, whether it be internal or external, be in response to a time out function or be generated in the interrupt service process, may be either set or reset so as to schedule the servicing of the respective interrupts.

Now referring to FIG. 7, the manner in which the S, D and Q bits received from the LEV instruction, the external interrupt or the time out function, operate to perform the operation as generally indicated by blocks 20, 23, 24 and 22 of FIG. 4, so as to generate the required control signals, will be explained. Thus, depending upon the nature of the interrupt, the S, D and Q bistable elements 70, 72 and 74 respectively will either be set or reset. For the external interrupt condition and the time out function as indicated by block 56, the S, D and Q bistable elements or flip-flops will be reset so as to generate a signal at each of their zero outputs. For an internal generated interrupt in the central processor 402, then depending upon the LEV instruction, one of the five conditions will be indicated thereby setting or resetting the respective elements 70, 72 and 74. As indicated hereinbefore, the operation for condition one is essentially the same as the operation for the external interrupt and the time out function in that the S, D and Q bits are all equal to a binary ZERO. Accordingly, the elements 70, 72 and 74 will be reset in response thereto to generate a signal at each of the zero outputs thereof. With the states of each of these elements being a binary ZERO state, then AND gate 76 will be fully enabled which in turn will fully enable AND gate 78 which via OR gate 80 will generate the SFHL signal, which indicates that the flags will be scanned to indicate the highest level. If as in conditions four and five, the S bit is a binary ONE on the other hand, then the RFCL signal will be generated indicating that the flag of the current level is to be reset or cleared. In addition, depending upon the state of the Q element, if set, then with the S bit equal to a binary ONE and the Q bit equal to a binary ONE for the fifth condition, gate 82 will be fully enabled which via OR gate 84 will generate a QLC or quick level change signal. If this is condition four whereby the S bit is a binary ONE and the Q bit is a binary ZERO, then AND gates 86 will be fully enabled to generate, via OR gate 80, the SFHL signal thereby generating a scan of the flags.

Having described conditions one, four and five as well as the external and TOF interrupts, for condition two wherein the one outputs of the S, D and Q elements are respectively a binary ZERO, ONE and ZERO, then AND gate 76 will be fully enabled and because the D element 72 has been set, will fully enable AND gate 88 to generate the FNI signal which indicates that the next instruction is to be fetched. For condition three, wherein the one output of the S element is a binary ZERO, the D element is either state (a don't care condition), and the Q element is a binary ONE, then gate 90 will be fully enabled via OR gate 84 which will generate a QLC signal indicating a quick level change.

Figure 8:
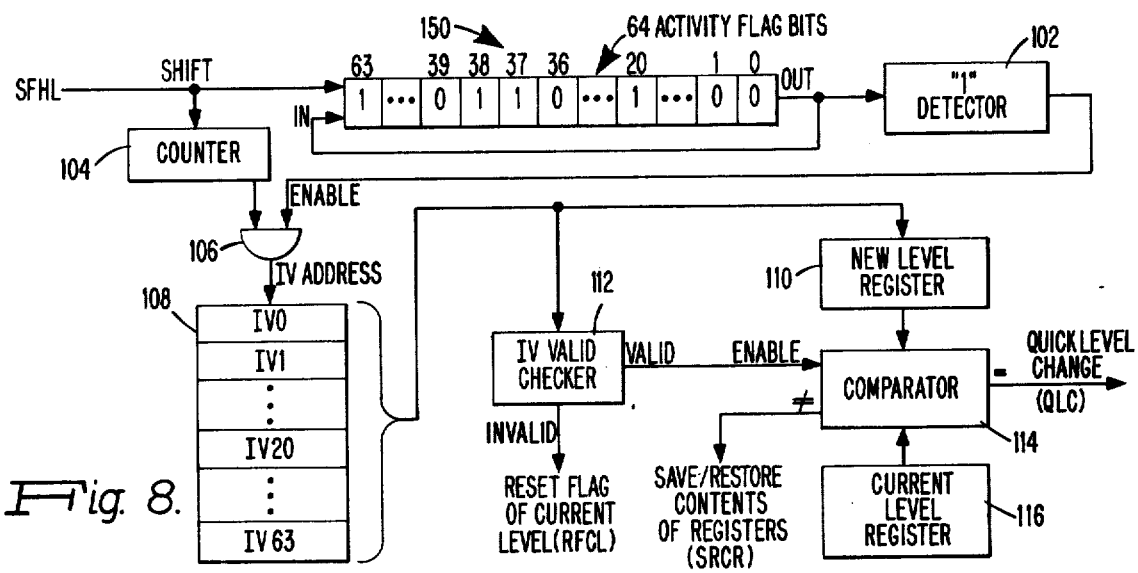
FIG. 8 is a detailed logic diagram illustrating the manner in which an interrupt is scanned and operated upon.

Now referring to FIG. 8, the activity flag bits which may comprise 64 in number are shown in register 150. The highest level (lowest number) is level zero which for purposes of illustration appears on the right side of the register. The apparatus of FIG. 8 shows the means by which such flags are scanned in order to determine the highest active level, as indicated by the process of block 25 in FIG. 4. The SFHL signal is utilized to shift the bits in register 150 one by one to the output of register 150 for detection by binary ONE detector 102. The output of register 150 is connected back to its input and by means of this embodiment, each time there is an SFHL signal, there is a complete shift of the entire 64 bits out of and then back into register 150. At the same time that the bits are shifting one by one to the output of register 150, the counter 104 is coupled to count the number of shifts. When a binary ONE is detected by detector 102, this enables gate 106 to provide the interrupt vector address from counter 104 through gate 106 to address the interrupt vector area which may be in a dedicated location in memory 108. The 64 activity flag bits may actually be stored in four 16 bit word locations in a dedicated location in memory also. In such case, the word containing the highest level activity bit would be accessed first and each bit of a word would be checked in parallel to see if there is a bit in the binary ONE state. If this is the case, then there need be no access of the second, third and fourth activity bit words. When the activity bit word is found having an activity bit set, then the location of this bit may be checked in the same manner as shown for the entire 64 bits as illustrated in FIG. 8. In such embodiment, the number of activity bit words accessed would also have to be kept track of in order to determine the actual interrupt vector address. In addition, as shown in FIG. 8, the output of counter 104 may not directly address the interrupt vectors 108 via gate 106, but rather an index address may be utilized so as to point to the first dedicated location for the interrupt vectors. Thus, by the scan of the register 150, as shown the highest active level would be level 20 as indicated by the binary ONE state therein. This, when shifted from the output of register 150 will be detected by detector 102 and together with the count indicated by counter 104, will address IV20.

Each of the interrupt vectors may include a pointer to an interrupt save area which may be located at any location in memory. Once the interrupt vector is addressed, then the level associated therewith will be transformed to a new level register 110. In addition such level as well as the interrupt save area addressed may be provided to IV invalid checker 112 which as indicated hereinbefore may simply check to determine whether or not there are all binary ZEROES in such interrupt vector, in which case an invalid indication will be generated thereby causing the flag of the corresponding level to be reset in response to the RFCL signal so generated. If the interrupt vector is valid, then checker 112 will enable comparator 114 which in addition to having one input from the new level register 110 has as its other input the level of the current running process received from register 116. If the new level is equal to the current level, the operation of block 28 of FIG. 4 may take place such that a QLC signal will be generated, however, there will actually be no level change since it is the same level. If the new level and the current level are not equal as is the normal case, then the old and new IV values may be similarly compared. If these are equal, a QLC takes place which is a return from the inhibit operation. If they are unequal, there will be a save and restore operation of the contents of the various registers in response to the SRCR signal generated by the comparator 114.

Figure 9:
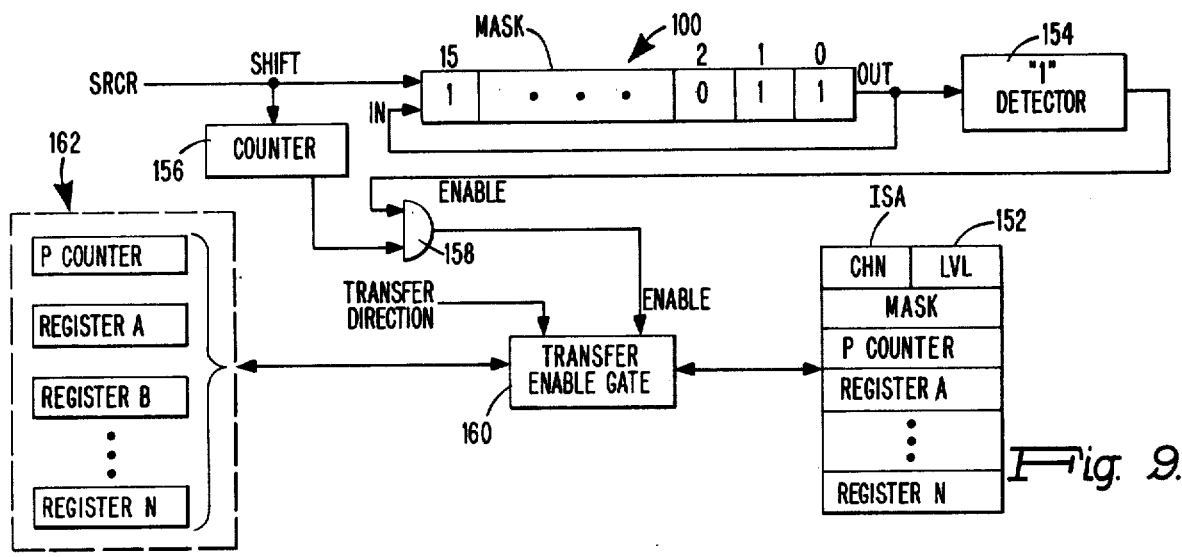
FIG. 9 is a logic diagram illustrating the manner in which various registers are stored and restored in conjunction with the operation of the present invention.

The apparatus for providing the save and restore operation of block 30 of FIG. 4 is illustrated in FIG. 9 which in response to the SRCR signal causes the mask register 100 to shift its contents out to the right. Mask register 100 may be initially included in the interrupt save area 152 for the particular interrupt vector address. The interrupt save area 152 includes, in addition to the mask, the channel and level number of the interrupt and locations to store the contents of the program counter and other registers A through N for example. The contents of some registers need not be saved, and this requirement may vary for different levels, and the mask 100 is utilized to determine which ones of such registers will be saved if the current level is interrupted by a higher level or will be restored if this is the new level which is interrupting the current level. Thus initially, the mask 100 is ascertained from the ISA either all at once or a bit at a time. In one embodiment the mask 100 may be placed in the register 100, and the SRCR signal is utilized to shift the contents thereof in a like manner as was the case for the activity flag bits 150 in FIG. 8, to a binary ONE detector 154 and in addition back to the input of register 100. At the same time, in response to the SRCR signal, 16 shifts are made in response to which counter 156 counts until gate 158 is enabled by detection of a binary ONE by detector 154, at which time the position in the mask of the binary ONE is transferred to gate 160 so as to enable the transfer of the information either from the interrupt save area to the registers generally indicated as 162 or from such registers 162 to the interrupt save area 152. The direction of the transfer is determined by the transfer direction signal received by gate 160. This direction signal may simply be a toggle such that a save is performed first followed by a restore. Each time a save and restore operation is provided, there will be a transfer in both directions so that initially the contents of the registers will be saved in the interrupt save area corresponding to the current level following which the new level interrupt save area contents will be transferred to the respective registers 162. As indicated by the binary ONES and binary ZEROES in the mask 100, the register to which location zero of mask 100 points will be saved as will be the case for locations one and 15. A register corresponding to location two will not be saved because of a binary ZERO condition. Thus, the contents of mask 100 will be shifted out and each time there is a binary ONE indicated there will be a save of the registers as indicated by the mask 100 of the current level. Following this there will be a restore of the registers as indicated by another mask for the new level as indicated by its interrupt save area 152. It is thus noted that by use of the mask 100, only the registers which must be saved or restored for a particular level are so operated on, thereby saving time by not saving or restoring other unnecessary information.

A quick level change may be generated in response to condition three as indicated by the internal interrupt LEV instruction or if the new interrupt vector is equal to the old interrupt vector. Accordingly, the operation of block 29 will be provided as shown in FIG. 10. The interrupt vectors 108 are shown to include interrupt vectors zero through 63 and accordingly indicates 64 interrupt levels. Each interrupt vector includes a pointer to its interrupt save area in any location in memory. Not every interrupt vector may be committed to a particular interrupt save area. For example, as shown, interrupt vector 10 does not point to any particular interrupt save area initially, but as shall be seen in response to a quick level change, will point to interrupt save area 50. Thus normally, the current level in register 250, provides an IV address and accordingly addresses the interrupt vectors 108 via OR gate logic 252 and AND gate logic 259, which via inverter 261 is enabled when the QLC signal is not activated. In this manner, the proper interrupt save area will then be addressed by the ISA pointer included in the interrupt vector. The ISA pointers may be initialized into the interrupt vectors area 108 at the start up of the system or may be changed dynamically during the operation thereof. If the current level 250 addresses interrupt vector 50, then the ISA pointer therein may be stored in register 254 or may be accessed from the interrupt vector area when needed. When the instruction indicates a quick level change, then the new level of the same process is indicated by means of register 256 which is enabled via means of the QLC signal through AND gate 258 to address the interrupt vectors via OR gate 252. Accordingly at this point, the AND gate 260 will also be enabled so as to pass the current level ISA pointer into the interrupt vector area of the new level. Thus assuming that the current level points to interrupt vector 50 and that such interrupt vector 50 points to interrupt save area 50, then such process running at level 50 will be more interruptable than one running at level ten. It may be desirable during the running of a particular portion of the process to change levels so that such process is less interruptable. Accordingly if it is desirable during the operation at level 50 to change to level 10, then the ISA pointer for level 50 which is stored in register 254 is written into the ISA pointer for interrupt vector 10 in response to the QLC signal and the new level address provided via register 256. Accordingly, the ISA pointer for interrupt vector 10 will also point to the ISA 50 via line 262. The interrupt vector 50 will also remain pointing to interrupt save area 50 and accordingly a save and restore function of the various registers need not be provided since in fact the same process will be running. A quick level change back to the lower level, i.e., level 50 is accomplished in the same manner. Thus, much time is saved during the quick level change, by avoiding the time necessary to perform the save and restore function.

While the invention has been particularly shown and described with reference to preferred embodiments thereof, it will be understood by those skilled in the art that the foregoing and other changes in form and details may be made therein without departing from the spirit and scope of the invention.

Having described the invention, what is claimed as new and novel and for which it is desired to secure Letters Patent is:

1. In a data processing system having a plurality of interrupt sources, interrupt processing apparatus comprising:
   A. means for receiving an interrupt signal from one of said sources, said interrupt signal indicative of one of a plurality of interrupt levels, said levels numbered so that a first number indicates a highest interrupt level and so that a last number indicates a lowest interrupt level, said interrupt signal comprising first, second third and fourth fields, each said field having one or more bits of information, said first, second and third fields each capable of having first and second states for indicating an operation to be provided for said interrupt source from which said interrupt signal is received, and said fourth field indicating the interrupt level number of said interrupt source from which said interrupt signal is received;
   B. interrupt flag register means having a plurality of flag locations equal in number to the number of said interrupt levels, said flag locations numbered in correspondence with the respective numbers of said interrupt levels;
   C. means, responsive to said interrupt signal, for activating a one of said flag locations corresponding in number to the level number indicated by said interrupt signal;
   D. scanning means, responsive to the receipt of said interrupt signal by said means for receiving, for determining which one of said flag locations is an activated location having the highest interrupt level relative to any other activated flag locations; and
   E. means, responsive to said scanning means, for enabling interrupt service for a one of said sources associated with the one of said flag locations which is indicative of the highest activated interrupt level as determined by said scanning means.

2. Apparatus as in claim 1, further comprising:
   A. an electrical bus; and
   B. means for coupling said interrupt sources to said bus, wherein at least one of said sources is included in a data processing unit, and wherein said interrupt processing apparatus is included in said data processing unit.

3. Apparatus as in claim 2 wherein said interrupt source included in said data processing unit is defined as an internal source and wherein the other ones of said sources are defined as external sources, said apparatus further comprising:
   A. means for indicating the interrupt level number of the currently active interrupt source;
   B. means for comparing the indicated interrupt level of the currently active interrupt source with the interrupt level number received from one of said external interrupt sources; and
   C. means for enabling said interrupt service for said external interrupt source for which said interrupt level was received if the number of said received interrupt level is closer to said first number than is the number of the indicated interrupt level of the said currently active interrupt source.

4. Apparatus as in claim 3 further comprising means for enabling the receipt of an interrupt signal from one of said external sources in response to the completion of said interrupt service for said currently active interrupt source.

5. Apparatus as in claim 2 wherein said data processing unit includes a plurality of interrupt sources, each having a different interrupt level.

6. Apparatus as in claim 1 further comprising means, responsive to the simultaneous presence of the first state of each of said first, second and third fields, enabling said scanning means.

7. Apparatus as in claim 1 further comprising means, responsive to the simultaneous presence of the first state of both said first field and said third field and the second state of said second field for activating the one of said flag locations corresponding to the level indicated by said fourth field and for inhibiting the operation of said scanning means.

8. Apparatus as in claim 1 further comprising means, responsive to the simultaneous presence of the second state of said first field and the first state of said third field, for enabling said means for scanning.

9. Apparatus as in claim 8 further comprising means, responsive to the second state of said first field for deactivating the flag location corresponding to the currently active level.

10. Apparatus as in claim 1 further comprising means, responsive to the simultaneous presence of the first state of said first field and the second state of said third field, for changing the current level number to the level number indicaated by said fourth field.

11. Apparatus as in claim 1 further comprising means, responsive to the simultaneous presence of the second state of both said first and third fields, for changing the current level number to the level number indicated by said fourth field and deactivating the flag location corresponding to the currently active level.

12. Apparatus as in claim 1 further comprising means, responsive to the simultaneous presence of the second state of said first field and the first state of said third field, for deactivating the flag location corresponding to the currently active level prior to the operation of said scanning means.

13. Apparatus as in claim 1 further comprising means responsive to a said interrupt signal from a said external interrupt source for providing interrupt service for said external source without scanning said flag locations, thereby bypassing the operation of said scanning means.

14. Apparatus as in claim 2 further comprising:
A. a plurality of register means capable of storing information therein, said registers useable for providing said interrupt service for any one of said interrupt sources;
B. storage means;
C. means for saving the information included in predetermined ones of said registers in a predetermined area of said storage means; and
D. means for transferring information included in another predetermined area of said storage means to predetermined ones of said registers.

15. Apparatus as in claim 14 wherein said means for storing and said means for transferring are responsive to said means for scanning, said means for storing coupled for saving information useable by said currently active interrupt source and said means for transferring coupled for restoring information in said register means for the interrupt source having the highest interrupt level relative to any other active interrupt level as determined by said means for scanning.

16. Apparatus as in claim 1 wherein one of said sources is a data processing unit and wherein only the interrupt signals generated by said data processing unit include said first, second, third and fourth fields, and wherein said interrupt signals generated by all other interrupt sources except said data processing unit include only said fourth field.

* * * * *